April 29, 1969   F. L. MALONE   3,441,045
VARIABLE ORIFICE NOZZLE MIXING EJECTOR
Filed Dec. 2, 1966

INVENTOR.
FRANK L. MALONE
BY Glenn Orlob
AGENT

United States Patent Office 3,441,045
Patented Apr. 29, 1969

3,441,045
VARIABLE ORIFICE NOZZLE MIXING EJECTOR
Frank Leslie Malone, Seattle, Wash., assignor to The Boeing Company, Seattle, Wash., a corporation of Delaware
Filed Dec. 2, 1966, Ser. No. 598,836
Int. Cl. G05d 11/00, 11/04, 11/02
U.S. Cl. 137—114                                   17 Claims

ABSTRACT OF THE DISCLOSURE

On turbine engine powered aircraft, the engine air compressor section is a readily available source for providing the required air flow rate to the air conditioning and pressurization systems and in general, the lowest operating penalty results when the source of air is from the lowest engine compressor stage; therefore, a variable orifice nozzle means is provided in combination with the extraction of high and low pressure bleed air for providing the required flow rate through ejection mixing of high pressure air to boost the low pressure bleed-air airpressure.

---

This invention relates to a fluid flow delivery system and, more particularly, to the means for controlling the pressurized fluid flow from two or more sources; wherein, the fluid pressure from one of the sources is higher relative to the other. Further, this invention relates to a variable area nozzle means having a self-energizing control system for increasing the pressure level of the lower pressure fluid and thereby providing for a high performance ejector pumping system.

Although this invention may be utilized in other embodiments, such as hydraulic systems and other liquid flow devices, it will be described in conjunction with a jet-engined aircraft where the multi-stage engine compressor section of the jet engine is used for supplying pressurized air to the cabin air conditioning system. Generally, the air conditioning system in an aircraft requires a relatively constant air flow rate regardless of the wide operating power range of the jet engine; therefore, this invention is specifically adaptable to such system. However, this invention is equally adaptable to an air conditioning system wherein the jet engine operates at a relatively constant power level and the demand flow for air fluctuates.

On many jet turbine-engined aircraft, the engine air compressor section is a readily available source of pressurized air for the cabin air conditioning system and this air which is extracted from the air compressor section is commonly referred to as "compressor bleed air" or just "bleed air." Use of this bleed air generally results in a penalty to the total operating efficiency of the engine in terms of propulsion thrust available to the aircraft, but this penalty can be held to a minimum when the air is extracted from the lowest pressure stage of the jet engine air compressor section that can deliver the normally required flow rate when the engine is operating at cruise power settings. However, when the engine is operating at power levels below the normal cruise condition; e.g., during descent or landing, the low pressure stages will not meet the required air flow rate. Therefore, this invention permits the air conditioning system to be designed such that the low pressure stages of the air compressor section delivers the required flow rate while the engine is operating at normal cruise power and when the engine is operated at the lower power settings, air from the higher pressure stages of the jet engine air compressor section is utilized to supplement the lower pressure stage air and to maintain the air flow rate to the air conditioning system relatively constant. Some presently known air conditioning systems provide a switch-over arrangement whereby either high or low pressure air is used at any one time depending on the demand flow rate but with such systems the engine thrust efficiency suffers a rather high penalty; and in addition, larger heat exchangers in the air conditioning system are required due to the use of the higher temperature air from the high pressure compressor stage supplying the flow rate demand.

Therefore, it is an object of this invention to provide a fluid flow delivery system utilizing a variable orifice nozzle mixing ejector for meeting flow rate requirements of a fluid system by increasing the pressure level of a continuous delivery low pressure fluid system to meet flow and pressure requirements of a primary system through controllable supplemental utilization of a higher pressure fluid source to increase the flow rate and pressure level of the lower pressure fluid by an aspiration ejection pumping action.

Another object of this invention is to provide an airflow delivery system to meet the flow rate requirements of an aircraft compartment air conditioning system by bleeding high pressure and low pressure air from a jet engine compressor section and efficiently mixing them in proper proportions in order to meet and maintain constant, the requirements of the aircraft's air conditioning system at all normal operating levels of engine power.

Another object of this invention is to provide an airflow delivery system utilizing air from a jet engine compressor section so as to impose a minimum efficiency penalty on the jet engine.

Another object of this invention is to provide an airflow delivery system which extracts air from the engine air compressor section so as to make full use of the flow energy of the higher pressurized air by utilizing it to pump the lower pressurized air into the air conditioning system at the lower engine power levels.

Other objects and advantages of this invention will become apparent to those skilled in the art from the following description and drawings. Referring now to the drawings.

Figure 1:
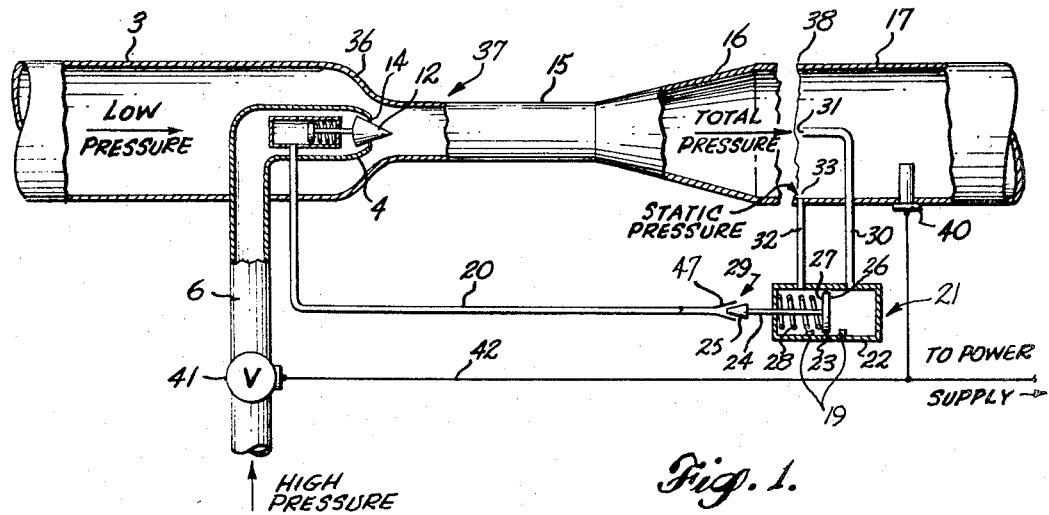
FIGURE 1 is a side elevation view of an embodiment shown in partial section to illustrate the various components of this invention.

Referring to the drawings, FIGURE 1 depicts a mixing ejector system wherein a portion of the high pressure air supply line 3, both of which lines come from the high and low pressure stages respectively of a jet engine compressor section (not shown). The high pressure air supply line 6 has at its terminus 4, an orifice 14 and a conical translating plug 12 that function to provide an effective variable orifice later to be described. The low pressure air supply line 3 is reduced in cross section at 36, near the exit plane of the high pressure orifice 14, to form a venturi section 37 having its inlet at 36, a throat section 15 and a diffuser discharge section 16. The diffuser section 16 is connected at its downstream end 38 to duct 17. The cross-sectional area of throat 15 should be sized for a flow velocity below Mach 0.9 to prevent inlet choking and a high diffuser pressure losses.

The relative cross-sectional areas of orifice 14 and throat 15 should de determined for optimum performance within a predetermined range of the operating conditions to be encountered. In addition, the size range of variable orifice 14 should be selected by evaluation of both the system requirements and the pressure source conditions. The longitudinal central axis of the orifice for efficient operation, should be substantially coincident with the longitudinal axis of throat 15, and the vertical plane of said orifice with reference to FIGURE 1, should be located within a distance of one orifice diameter from the throat entrance 15. The entrance of throat 15 is generally considered to be at its tangency with transition section 36. This range of longitudinal location for orifice may vary to some extent with the sizes of ducts 3 and 6 and throat 15, since it has been determined that as orifice 14 is located deeper into throat 15, the presence of the terminal end 4 of duct 6, tends to choke off the flow of low pressure air into throat 15. On the other hand, as orifice 14 is moved further upstream of the entrance of throat 15, the pumping effect of the high pressure jet stream leaving orifice 14 decreases.

Since it is desirable to have complete mixing of the high and low pressure air occur within throat section 15, it has been determined that the length of the throat section 15, should be somewhere within the range of five to ten times the diameter of said throat. The effect of complete mixing of the air before it enters transition section 16, is to attain a fairly even energy distribution of the air as it enters duct 17.

Figure 2:
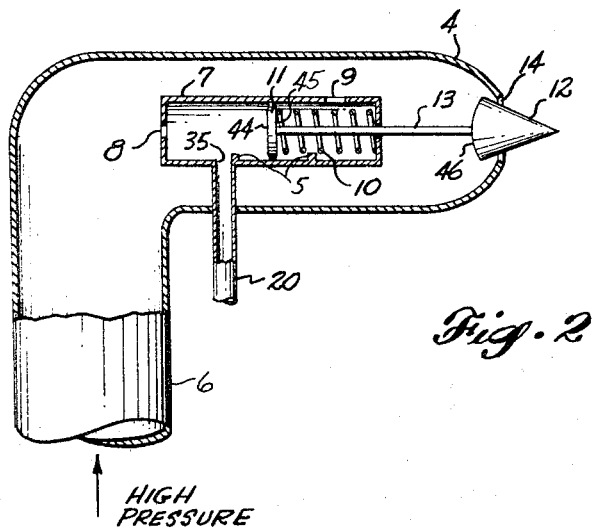
FIGURE 2 is a more detailed view of the nozzle and its internal control means shown in FIGURE 1.

To maintain an adequate air flow delivery rate to the cabin air conditioning system during changes in system back pressure, a flow biased control device 21 is provided which comprises a housing 22 having a piston 23 contained within said housing and a connecting rod 24 attached at one end to piston 23 and the other end to a translating plug 25. A tube 30 is connected at one end to housing 22 and the other end of said tube has an opening 31 exposed to the total pressure in duct 17 downstream of the diffuser discharge section 16. This total pressure pickup in tube 30 is communicated to housing 22 so as to expose the piston face 26 to the total pressure in duct 17. The opposite piston face 27 is exposed through tube 32 to the static pressure within duct 17 at the downstream end 38 of the diffuser section section 16. Stop means 19 are provided within housing 22 for limiting the travel of piston 23. In order to balance the differential pressure forces acting on piston 23, a spring 28 is provided. This spring 28 also functions to retain the translating plug 25, which controls the venting of air from tube 20 to the ambient atmosphere at location 29, in sealing engagement within the opening 47 of tube 20 when an adequate airflow delivery rate is being provided by the low pressure air supply line 3 to the cabin air conditioning system. When the delivered rate of flow from the low pressure air supply line 3 is inadequate to meet the demand requirements of the cabin air conditioning system, the flow biased control device 21 actuates the variable area nozzle means housed within the terminus of the high pressure air supply line 6 thereby increasing the flow rate and pressure level of the lower pressure air through an aspiration ejection pumping action to meet the demand of the air conditioning system. A more detailed view of the variable area nozzle and its internal control means is shown in FIGURE 2, wherein a cylindrical housing means 7, is positioned within the high pressure line 6 and contains a translating piston 11 which is connected to a conical plug 12 by interconnecting rod 13. Housing 7 is provided with ports 8 and 9 which vent the high pressure air to a chamber on either side of piston 11. Stop means 5 are provided within the housing for limiting the travel of piston 11. Air pressure bleed line 20, which enters the housing 7 at opening 35 on one side of piston 11, is connected to the flow biased control device 21. The compression spring 10 functions to increase the opening of orifice 14 by opposing the resultant high pressure force acting against the base 46 of the conical translating plug 12, thereby tending to throttle orifice 14. A dampening characteristic is applied to the compression spring 10 by the air pressure forces across the translating plug 12 reacting through rod 13 and piston 11.

During the normal cruise power settings of the jet engine, air is extracted from the lowest pressure stage of the jet engine air compressor section that can deliver the normally required flow rate to the cabin air conditioning system and this low pressure air flowing through supply line 3 passes through venturi 37 and into duct 17. The forces of total and static pressures sensed at openings 31 and 33 respectively, act on piston 26 in combination with the force of spring 28, to maintain translating plug 25 in its closed position to seal the opening 47 of tube 20. The effect of stopping the pressure bleed flow from the housing 7 through line 20 causes the high pressure air force within line 6 to act against the base 46 of conical translating plug 12 thereby slightly overcoming the predetermined opposing force of the compression spring biased piston 11 (which through venting by ports 8 and 9 is fluid pressure balanced), to maintain the translating plug 12 in sealing engagement with orifice 14. The force characteristics of compression spring 10 are selected such that at the above-stated normal operating conditions, the total force urging translating plug 12 to an open position will be slightly less than the total force holding said plug in its closed position.

When the jet engine power settings are gradually decreased below the normal cruise power settings thereby resulting in a gradual decrease in the air pressure available from the low pressure compressor stage to the extent that it cannot supply the entire demand flow rate of the cabin air conditioning system, the air pressure from the high compressor stage is likewise reduced by this decrease in power setting, but to a slightly greater extent, such that the force of compression spring 10 is sufficient to begin to draw the translating plug 12 back to start opening orifice 14 before the flow biased control device 21 functions to actuate the variable area nozzle means through unbalanced fluid pressure forces acting on piston 11. The reason that the flow biased control device 21 does not immediately respond to actuate the variable area nozzle means is due to the decrease in air pressure in line 20 which has likewise decreased in proportion to the air pressure from the high compressor stage thereby decreasing the force required to retain translating plug 25 in sealing engagement within opening 47 of tube 20.

As the jet engine power settings are further decreased to the point that the flow requirement is still not being met by the low pressure air and the slightly metered high pressure air which is now slightly functioning to increase the flow rate and pressure level of the lower pressure air through an aspiration ejection pumping action to meet the flow requirements of the air conditioning system, the decreased total pressure is sensed at opening 31 which in turn decreases the air pressure force acting on piston face 26. Since the static pressure force acting on the opposite piston face 27 does not decrease in direct proportion to that of the total pressure, the increased differential in air pressure forces within housing 22 function to move piston 23 and translating plug 25 to bleed high pressure air from line 20 to the ambient atmosphere at 29. This bleeding of high pressure air from housing 7 through line 20 results in a differential air pressure force acting on piston 11 to increase the exit area between orifice 14 and translating plug 12 thereby increasing the flow rate of the high pressure air to meet the demand flow requirement determined by the flow biased control device 21.

In general, it can be stated that the initial movement of translating plug 12 is governed by slight changes in the differential pressures acting across the translating plug 12 due to the varying differential pressure between the high and low pressure air from the high and low compressor stages during slight changes in engine power settings below the normal cruise power settings and that a further or greater amount of movement of translating plug 12 is related to the amount of unbalance between the forces acting on piston 23 in the flow biased control device 21, which movement in turn governs the fluid exit area through orifice 14 from which the high pressure air enters venturi 37 and the flow of this high pressure air from orifice 14 augments the flow of the low pressure air from line 3. Further, the variable area nozzle mixing ejector not only provides for the mixing of the high pressure air with low pressure air in order to adequately supply the air to the cabin air conditioning system when the differential pressure balance between the high and low pressure stages of the engine air compressor stage is varied from the pre-set balanced condition with the engine at cruise power condition, but in addition, the total energy of the high pressure air leaving the orifice 14 serves two other functions for the system. First, the fluid shear forces, between the boundary layers of the high and low pressure air immediately downstream of orifice 14, create a pumping effect by drawing the low pressure air along with the high pressure air through an aspiration ejection pumping action that increases the flow of air from the low stage of the engine compressor section and this aspiration of low pressure air continues so long as there is a flow of high pressure air through orifice 14. The rate of aspiration varies in proportion to the amount of high pressure air flowing through orifice 14. Second, the total pressure energy of the high and low pressure air mixed within the throat section 15, is greater than that which would normally be attributed to the addition of the inividual amounts of low pressure and high presure flow, because the energy of the high pressure is utilized for increasing the flow rate of the low pressure air and the velocity head of the mixed air. Rather than dissipating the pressure energy of the high pressure air through a throttling device and heat exchanger prior to directing it into the air conditioning system, the increase in velocity head contributed by ejecting the high pressure air into the stream flow of air from the low pressure stage, is utilized to increase the velocity of air through duct 17 and thereby efficiently increase the flow to the cabin air conditioning system. The design of this air flow delivery system takes into consideration that energy is wasted in throttling high pressure stage air from a jet engine down the required pressure level for use in aircraft cabin air conditioning system. To utilize this energy more fully, high pressure stage air is passed through a nozzle into a venturi-type ejector to increase the flow of low pressure stage air under those engine operating conditions which would not otherwise provide sufficient air. An additional benefit of this device is obtained by the fact that only a relatively small amount of high pressure, high temperature air is required to enter the system at high engine power levels and therefore a minimum size heat exchanger may be used in conditioning the air for cabin utilization.

As shown in FIGURE 1, a temperature control device is provided which comprises a temperature sensing means 40 responsive to the air temperature in duct 17, and a shut-off valve 41 located in the high pressure air supply line 6. The valve 41 is normally in an open position and at a predetermined temperature sensed by temperature sensing means 40, is controllably actuated to be shut off. In the embodiment illustrated, the temperature sensor means is set to close valve 41 at approximately 450° F. Also, the temperature sensing device 40 provides a safety feature in the event translating plug 12 becomes stuck open, the controllably actuated valve 41, would respond to an increase in temperature in duct 17 by shutting off the supply of high pressure air in line 6. This feature would likewise actuate the closing of valve 41 in the event that the flow biased control device called for an excess of high pressure air. Additional fail-safe features of this device are provided by this design so that failure or breakage of either balance springs 10 or 28 will result in translating plug 12 being held in a closed position thereby shutting off the supply of high pressure in line 6 as stated previously.

While I have described and illustrated some preferred forms of my invention, many modifications and system adaptations can be made without departing from the spirit and scope of the invention:

If, the ejector system is to be used for starting other engines on the aircraft, and additional flow is required above that required for the air conditioning system, a valve may be provided in line 20 to open the line to ambient pressure and bypass the bias control device 20. In addition, the temperature sensor 40 may have to be by-passed.

The total flow capacity of the unit can be varied to meet the requirements of a particular configuration of a fluid system. The ratio of high to low presure fluid flow design can also be varied through sizing of the orifice 14, plug 12, spring constant 10 and a flow biased control device 21. A typical installation would be designed for the plug 12 to fully close orifice 14 at high engine powers and fully open orifice 14 at idle power conditions. The flow schedule between fully open and fully closed can also be varied if desired through contouring of the plug 12.

For fixed back pressure system such as bleed air anti-icing, bleed air boundary layer control, bleed air pneumatic power and thrust augmentation systems it may not be necessary to provide the flow bias control device 21.

For hydraulic or liquid flow systems the operation of the fluid flow delivery system would be similar, in that, under normal design operating conditions utilizing continuous delivery of low pressure fluid for meeting the system demand, the flow biased control device 21 holds translating plug 25 in a position sealing opening 47 which in turn as previously described would function to seal orifice 14 with translating plug 12. As the fluid pressure is supply line 6 decreased, the total energy head at opening 31 would likewise decrease thereby placing the flow bias control device 21 in an unbalanced condition and cause translating plug 25 to move to unseal opening 47. The resultant venting of line 20 to the return line of a hydraulic system causes an unbalance of the forces acting on piston 11 which results in moving translating plug 12 to increase the opening of orifice 14. The flow of high pressure fluid from an auxiliary high pressure source, through orifice 14 and into throat 15 of venturi 37, pumps additional fluid from the low pressure supply line 6 into the system and adds to the velocity head of fluid in duct 17. When the total static energy heads sensed at openings 31 and 33 respectively, indicate that the design fluid flow conditions are attained, the flow biased control device 21 will be repositioned to a balance condition with translating plug tending to seal the end 47 of line 20. With this occurrence, the unbalance of pressure forces on piston 11 will cause translating plug 12 to move toward the closed position until a balance of forces is oobtained. If the fluid presure in supply line 6 will again meet the design flow requirement, the translating plug 12 will move to the closed position and shut off the flow of high pressure fluid from the auxiliary high pressure source through variable orifice 14. The response time of this device has been found to be very rapid, so that a relatively constant flow of fluid may be maintained in delivery duct 17 under a wide range of operating conditions.

I claim:
1. A pressurized flow delivery system comprising, conduit means for delivering fluid from high and low pressure sources to the inlet of a venturi, variable orifice nozzle means for controlling the flow of said high pressure fluid source to the inlet of said venturi, and means responsive to the total fluid flow of said venturi for controlling the orifice of said nozzle means.

2. The combination according to claim 1 including thermal means responsive to the total fluid flow of said venturi for controlling the flow of fluid from said high pressure source to said variable orifice nozzle means.

3. The combination according to claim 1 wherein said variable orifice nozzle means comprises, translating plug means and pressure balance piston means operatively connected to said translating plug means for varying the ejective area of said nozzle means.

4. The combintaion according to claim 3 wherein said pressure balance piston means is positioned within housing means for axially reciprocable movement therein.

5. The combination according to claim 3 wherein said pressure balance piston means comprises, a piston, means for delivering a fluid pressure force from said high pressure source to one side of said piston for providing a froce to increase the ejective area of said nozzle means, and means for delivering a fluid pressure force varying as a function of the total fluid flow of said venturi to the opposite side of said piston for providing a force to decrease the ejective area of said nozzle means.

6. In an airflow delivery system supplying bleed air from a turbine engine compressor section, said system comprising, conduit means for delivering bleed air from the high and low pressure stages of a turbine engine compressor section to the inlet of a venturi, variable orifice nozzle means for controlling the flow of said bleed air to the inlet of said venturi and means responsive to the total airflow downstream of said venturi for controlling the orifice of said nozzle means.

7. The combination according to claim 6 wherein said variable orifice nozzle means controls the flow of bleed air from said high pressure stages of the turbine engine compressor section to the inlet of said venturi.

8. The combination according to claim 6 including thermally responsive means positioned at the throat exit of said venturi and operatively associated with said conduit means for controlling the flow of bleed air from said high pressure stage to said variable orifice nozzle means.

9. The combination according to claim 6 wherein said variable orifice nozzle means comprises translating plug means and pressure balance piston means operatively connected to said translating plug means for varying the ejective area of said nozzle means.

10. The combination according to claim 9 wherein said pressure balance piston means is positioned within housing means for axially reciprocable movement therein.

11. The combination according to claim 9 wherein said pressure balance piston means comprises, a piston, means for delivering a fluid pressure force from the high pressure stage of said turbine engine compressor section to one side of said piston for providing a force to increase the ejective area of said nozzle means, and means for delivering a fluid pressure force varying as a function of the total air flow downstream of said venturi to the opposite side of said piston for providing a force to decrease the ejective area of said nozzle means.

12. In an airflow delivery system supplying bleed air from a turbine engine compressor section to a compartment, said system comprising, a first conduit means for delivering bleed air from the low pressure stage of said turbine engine compressor section to the inlet of a venturi, second conduit means for delivering bleed air from the high pressure stage of said turbine engine compressor section to the inlet of said venturi, variable orifice nozzle means for controlling the flow of air from said second conduit means to the inlet of said venturi, and means responsive to the total ariflow downstream of said venturi for controlling the orifice of said nozzle means to maintain substantially uniform air flow delivery to said compartment.

13. The combination according to claim 12 wherein said variable orifice nozzle means is connected to said second conduit means and forming the terminus thereof for controlling the flow of bleed air from said high pressure stage to the throat entrance of said venturi.

14. This combination according to claim 12 including thermally responsive means positioned downstream of the throat exit of said venturi and operatively associated with said second conduit means for controlling the flow of bleed air from said high pressure stage to said variable orifice nozzle means.

15. The combination according to claim 12 including means responsive to the static pressure and velocity head positioned downstream of the throat exit of said venturi for varying the orifice of said nozzle means to control the airflow delivery to said compartment.

16. The combintion according to claim 12 wherein said variable orifice nozzle means comprises, translating plug means, and means for positioning said plug means with respect to the nozzle orifice for regulating the exit area for said bleed air from the high pressure stage of the turbine engine compressor section.

17. The combination according to claim 16 wherein said positioning means comprises a housing, slidable piston means contained within said housing and operatively connected with said plug means, means for introducing high pressure bleed air from said second conduit means to said housing at both ends of said piston means, and air flow sensing means positioned downstream of said venturi and operatively connected with said housing for selectively removing high pressure bleed air from said housing at one end of said piston means.

References Cited
UNITED STATES PATENTS

| | | | |
|---|---|---|---|
| 2,723,615 | 11/1955 | Morris et al. | 98—1.5 |
| 2,898,745 | 8/1959 | Weisel | 98—1.5 XR |
| 3,002,521 | 10/1961 | Greenlees et al. | 137—486 |
| 3,045,983 | 7/1962 | Best | 98—1.5 XR |
| 3,192,848 | 7/1965 | Townsend | 137—111 XR |
| 3,326,109 | 6/1967 | Markham | 98—1.5 |
| 3,376,802 | 4/1968 | Emmons | 98—1.5 |
| 3,367,255 | 2/1968 | Terp | 137—114 XR |
| 3,367,256 | 2/1968 | Townsend et al. | 98—1.5 |

DONALD E. WATKINS, *Primary Examiner.*

U.S. Cl. X.R.

137—468, 486, 492.5; 251—122; 98—1.5